(12) United States Patent
Kumar et al.

(10) Patent No.: US 12,289,708 B2
(45) Date of Patent: Apr. 29, 2025

(54) METHODS AND SYSTEM FOR TRIGGERS OF LEAVING PROCEDURE

(71) Applicant: Samsung Electronics Co., Ltd., Suwon-si (KR)

(72) Inventors: Lalith Kumar, Bangalore (IN); Mahmoud Watfa, Staines (GB); Varini Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 17/738,996

(22) Filed: May 6, 2022

(65) Prior Publication Data

US 2022/0361143 A1   Nov. 10, 2022

(30) Foreign Application Priority Data

May 6, 2021   (IN) .............................. 202141020724
Apr. 26, 2022  (IN) .............................. 202141020724

(51) Int. Cl.
*H04W 68/00* (2009.01)
*H04W 76/20* (2018.01)
*H04W 76/30* (2018.01)

(52) U.S. Cl.
CPC ......... *H04W 68/005* (2013.01); *H04W 76/20* (2018.02); *H04W 76/30* (2018.02)

(58) Field of Classification Search
CPC .... H04W 68/005; H04W 76/20; H04W 76/30
See application file for complete search history.

(56) References Cited

U.S. PATENT DOCUMENTS

| | | | |
|---|---|---|---|
| 2020/0196375 A1 | 6/2020 | Ryu et al. | |
| 2020/0336887 A1* | 10/2020 | Ou | H04W 8/24 |
| 2020/0396591 A1* | 12/2020 | Ou | H04W 76/30 |
| 2022/0104163 A1* | 3/2022 | Kim | H04W 68/005 |
| 2022/0132587 A1* | 4/2022 | Agiwal | H04L 1/1887 |
| 2022/0330202 A1* | 10/2022 | Kumar | H04W 60/00 |

FOREIGN PATENT DOCUMENTS

WO   2021/025308 A1   2/2021

OTHER PUBLICATIONS

Huawei, HiSilicon, "Support for UE-Slice-MBR", Change Request, 3GPP TSG-WG SA2 Meeting #144e e-meeting, Apr. 12-16, 2021, S2-2102217, 44 pages.

(Continued)

*Primary Examiner* — Ajay Cattungal (57) ABSTRACT

Methods and systems for triggers of leaving procedure methods and systems for triggers of leaving procedure. The method includes receiving, by the UE, an RRC signaling connection release from a wireless communication network. The RRC signaling connection release indicates that the UE moves to an RRC inactive state. The UE is in a multi-user services identity module (MUSIM) mode. The method includes determining, by the UE, if there is an activity over 3GPP access due to another USIM. The method includes transmitting, by the UE, a non-access stratum (NAS) message including a service request message. The method includes triggering, by the wireless communication network, a release procedure to transfer the UE to an IDLE state in response to receiving the services request message in RRC Inactive state.

18 Claims, 4 Drawing Sheets

(56) References Cited

OTHER PUBLICATIONS

Apple, "Inclusion of PDU Session Status IE in Service Request", Change Request, 3GPP TSG-CT WG1 Meeting #128e, Feb. 25-Mar. 5, 2021, C1-211388, 9 pages.

Vivo, "E-mail discussion: [Post111-e][917][Multi-SIM] Multi-Sim (vivo)", 3GPP TSG-RAN WG2 Meeting #112e, Nov. 2-13, 2020, R2-2009325, 74 pages.

Ericsson et al., "Function Description for Multi-SIM devices", Change Request, 3GPP TSG-SA2 Meeting #144e (e-meeting), Apr. 12-16, 2021, S2-2102170, 8 pages.

International Search Report dated Aug. 25, 2022 in connection with International Patent Application No. PCT/KR2022/006505, 3 pages.

Written Opinion of the International Searching Authority dated Aug. 25, 2022 in connection with International Patent Application No. PCT/KR2022/006505, 4 pages.

Examination report dated Jan. 20, 2023, in connection with Indian Application No. 202141020724, 6 pages.

3GPP TS 23.501 V17.4.0 (Mar. 2022), Technical Specification, 3rd Generation Partnership Project; Technical Specification Group Services and System Aspects; System architecture for the 5G System (5GS); Stage 2 (Release 17), Mar. 2022, 567 pages.

3GPP TS 23.502 V17.4.0 (Mar. 2022), Technical Specification, 3rd Generation Partnership Project; Technical Specification Group Services and System Aspects; Procedures for the 5G System (5GS); Stage 2 (Release 17), Mar. 2022, 738 pages.

3GPP TS 24.501 V17.5.0 (Dec. 2021), Technical Specification, 3rd Generation Partnership Project; Technical Specification Group Core Network and Terminals; Non-Access-Stratum (NAS) protocol for 5G System (5GS); Stage 3; (Release 17), Dec. 2021, 916 pages.

Samsung, et al., "NAS connection release from 5GMM-Connected mode with RRC inactive indication," C1-216044, 3GPP TSG-CT WG1 Meeting #132-e, E-meeting, Oct. 11-15, 2021, 6 pages.

* cited by examiner

METHODS AND SYSTEM FOR TRIGGERS OF LEAVING PROCEDURE

CROSS-REFERENCE TO RELATED APPLICATIONS

This application is based on and claims priority under 35 U.S.C. § 119 to Indian Patent Application No. 202141020724 filed on May 6, 2021, and Indian Patent Application No. 202141020724 filed on Apr. 26, 2022, in the Indian Intellectual Property Office, the disclosures of which are incorporated by reference herein in their entirety.

BACKGROUND

1. Field

Embodiments disclosed herein relate to wireless communication networks, and more particularly to leaving procedures in wireless communication networks.

2. Description of the Related Art

In general, a user equipment (UE) and the network may support paging restrictions. The UE may indicate paging restrictions information in a non-access stratum (NAS) message like service request, an extended service request or tracking area procedures or a registration procedure. The UE, if the network indicates that the network supports paging restrictions, may indicate paging restriction information which may indicate any of the following and not limited to:
  a) all paging is restricted;
  b) all paging is restricted, except paging for voice service (e.g., a multimedia telephony over internet protocol multimedia subsystem (MMTel) voice or a circuit switched (CS) domain voice); or
  c) all paging is restricted, except for certain packet date network (PDN) connection(s).

A network and a UE may support one or more of the following enhancements for multi-user services identity module (USIM) UE operation:
  Connection release;
  Paging indication for voice service;
  Reject paging request; and/or
  Paging restriction.

In the registration procedure, a multi-USIM UE may include the multi-USIM mode indication to the AMF, if the multi-USIM UE has more than one USIM active and intends to use multi-USIM specific features. Based on the received multi-USIM mode indication (or the capability) from the UE, the AMF may indicate to the UE the supported multi-USIM features by the network.

Connection Release

When accessing a core network, a multi-USIM UE may request the network to be released from CM-CONNECTED state due to activity on another USIM. The UE indicates that the UE requests to be released from CM-CONNECTED state, by initiating either a service request procedure or a registration procedure (in case the UE needs to perform registration update at the same time with this network), including a release indication. If supported by the UE, the UE may also provide, only together with the release indication, a paging restriction information, which requests the network to restrict paging. The paging restriction information from the UE is stored in the UE context in the AMF. If no paging restriction information is provided in the service request or the registration request, any stored paging restriction information in the UE context is removed. When the UE initiates a service request procedure or registration procedure without providing a release indication(also called as release request indication), the network removes any stored paging restriction information.

Based on activity ongoing on another USIM, a multi-USIM UE may respond to a page with a reject paging indication(also called as release request indication) to the network indicating that the UE does not accept the paging and requests to return to CM-IDLE state after sending this response. Upon being paged by the network, the multi-USIM UE in CM-IDLE state attempts to send a service request message to this network including the reject paging Indication, unless the multi-USIM UE is unable to do so; e.g., due to UE implementation constraints. In addition to the reject paging indication, the UE may include paging restriction Information in the Service request message, if supported by the UE.

The UE of the MUSIM UE sends NAS message to the network by including a release request flag to indicate to the network that the UE wants to release the signalling connection and get into either. INACTIVE state or IDLE state so that UE initiates operation on the second SIM.

Figure 1:
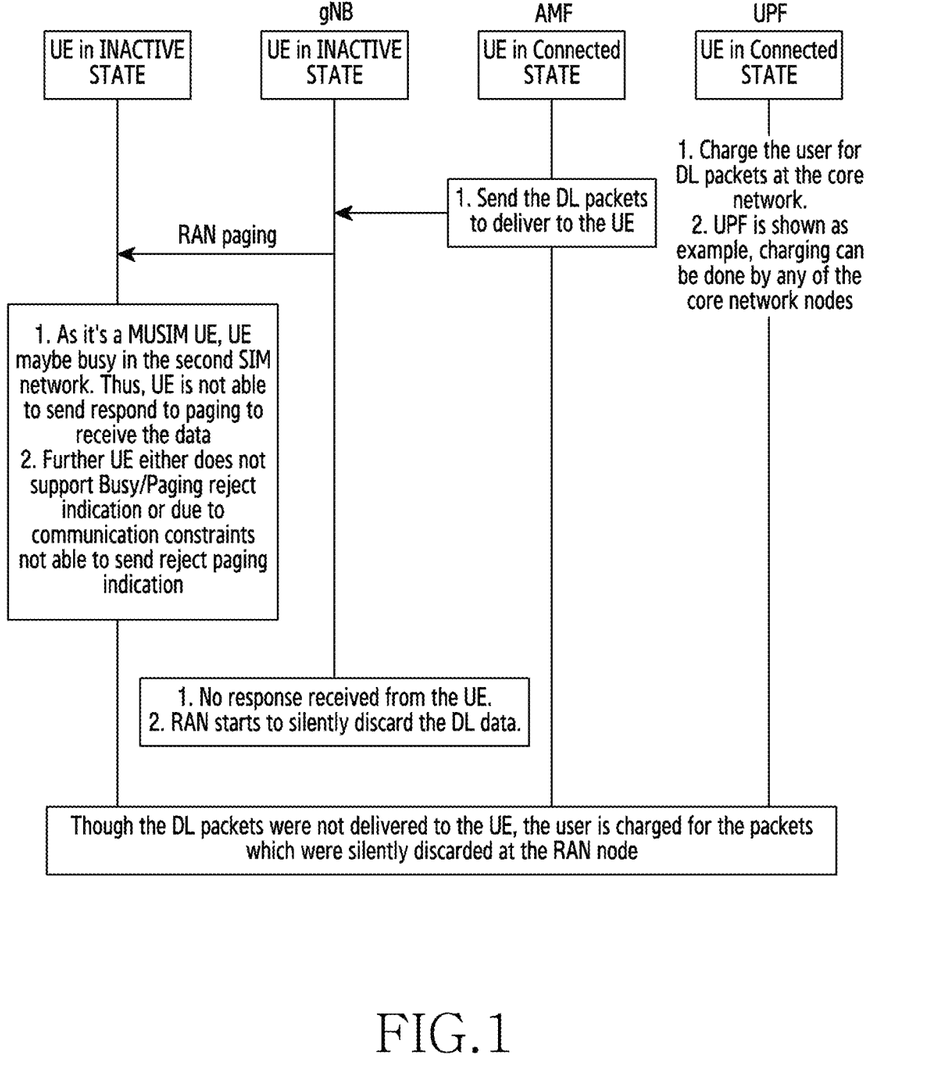
FIG. 1 illustrates a flow diagram depicting an example of a leaving procedure according to various embodiments of the present disclosure.

FIG. 1 illustrates a flow diagram depicting the leaving procedure. The UE is in RRC INACTIVE state; (i.e., 5GMM-CONNECTED mode with RRC inactive state). Downlink user data (DL data) is generated for the UE. The use plane function (UPF) executes charging records for this DL data or execute charging procedure for the DL data. UPF is indicated as an example core network node. This can be any of the $5^{th}$ generation system (5GS) core network nodes; i.e., essence of this step is that user is charged for this DL data. DL data is sent from the UPF to gNB (in general, any radio access network (RAN) node) to be delivered to the UE. The RAN node attempts to deliver the DL data. The RAN node sends the paging message to the UE, which in general is called as RAN paging or RAN level paging. The UE (which can be, for example, a MUSIM UE) may be busy on the second SIM network. Thus, the UE is not able to send response to paging message and receive the data; i.e., the UE is not able to transmit to connected mode. Also, if the UE either does not support busy/paging reject indication procedure or due to communication constraints not able to send reject paging indication (release request indication) to the network.

In yet another example, the UE may be not in service (i.e., UE is in the 5GMM_REGISTERED. NO CELL AVAILABLE state) and never received the paging message. In yet another example, the UE considers service ongoing on second SIM as higher priority when compared to the incoming service is in the INACTIVE state, thus the UE decides not to accept the paging and receive the DL data. These are example scenarios there can be many other examples due to which the UE (and this can be either MUSIM UE or general non MUSIM UE) is not able to respond to paging. The RAN node realizes that the paging procedure has failed and there is no response from the UE. The RAN node starts discarding the DL data. The end result of above steps is that the UE is charged for the DL data which UE never received on first hand. This issue is critical from the network perspective.

The principal object of the embodiments herein is to disclose methods and systems of triggers of the leaving procedure in wireless communication networks.

SUMMARY

Accordingly, the embodiments herein provide illustrates a method to move the UE from a radio resource control (RRC) inactive state to an IDLE state. The method includes receiving, by the UE, an RRC signaling connection release from a wireless communication network. The RRC signaling connection release indicates that the UE moves to RRC Inactive state. The UE is in a multi-user services identity module (MUSIM) mode. The method further includes determining, by the UE, if there is an activity over a 3rd Generation partnership project (3GPP) access due to another USIM. The method further includes transmitting, by the UE, a NAS message including a service request message. The service request message comprises a release request indication in response to determining that the UE is in the RRC INACTIVE state, and the activity over a (3GPP) access due to another USIM. The method further includes triggering, by the wireless communication network, a release procedure to transfer the UE to an IDLE state in response to receiving the services request message in RRC Inactive state.

Embodiments herein disclose, the release request indicates that the UE does not accept paging or requests the network to return to the IDLE state after sending the release request indication.

In an aspect, the embodiments herein provide a UE. The UE includes a memory, at least one processor, and a controller, connected with the memory and the processor is configured to: receive an RRC signaling connection release from a wireless communication network. The RRC signaling connection release indicates that the UE moves to RRC inactive state. The UE is in a MUSIM mode. The controller is further configured to determine if there is an activity over 3GPP access due to another USIM. The controller is further configured to transmit a NAS message comprising a service request message. The services request message comprises a release request indication in response to determining that the UE is in the RRC INACTIVE state, and the activity over the 3GPP access due to another USIM.

In an aspect, the embodiments herein provide a wireless communication network for triggering a leaving procedure. The network includes a memory, at least one processor, and a controller connected with the memory and the processor (140) is configured to trigger a release procedure to transfer the UE to an IDLE state in response to receiving the services request message comprises a release request indication in RRC Inactive state.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Figure 2:
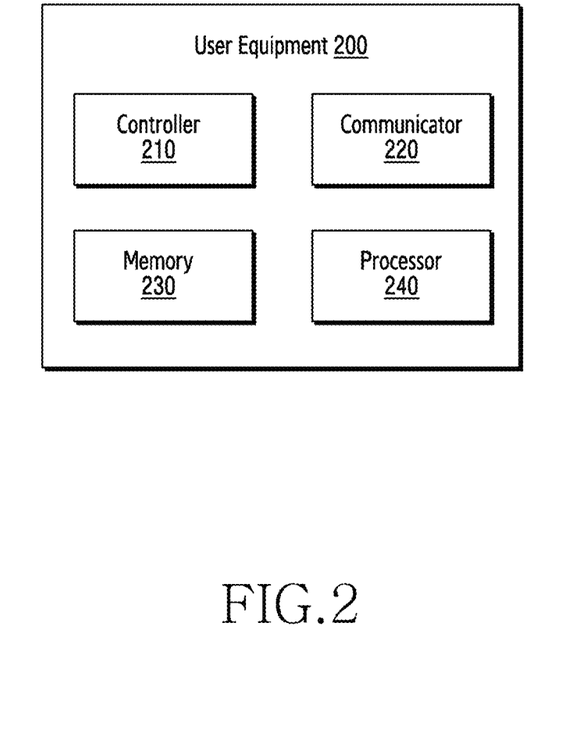
FIG. 2 illustrates hardware components of a UE according to various embodiments of the present disclosure.
Figure 3:
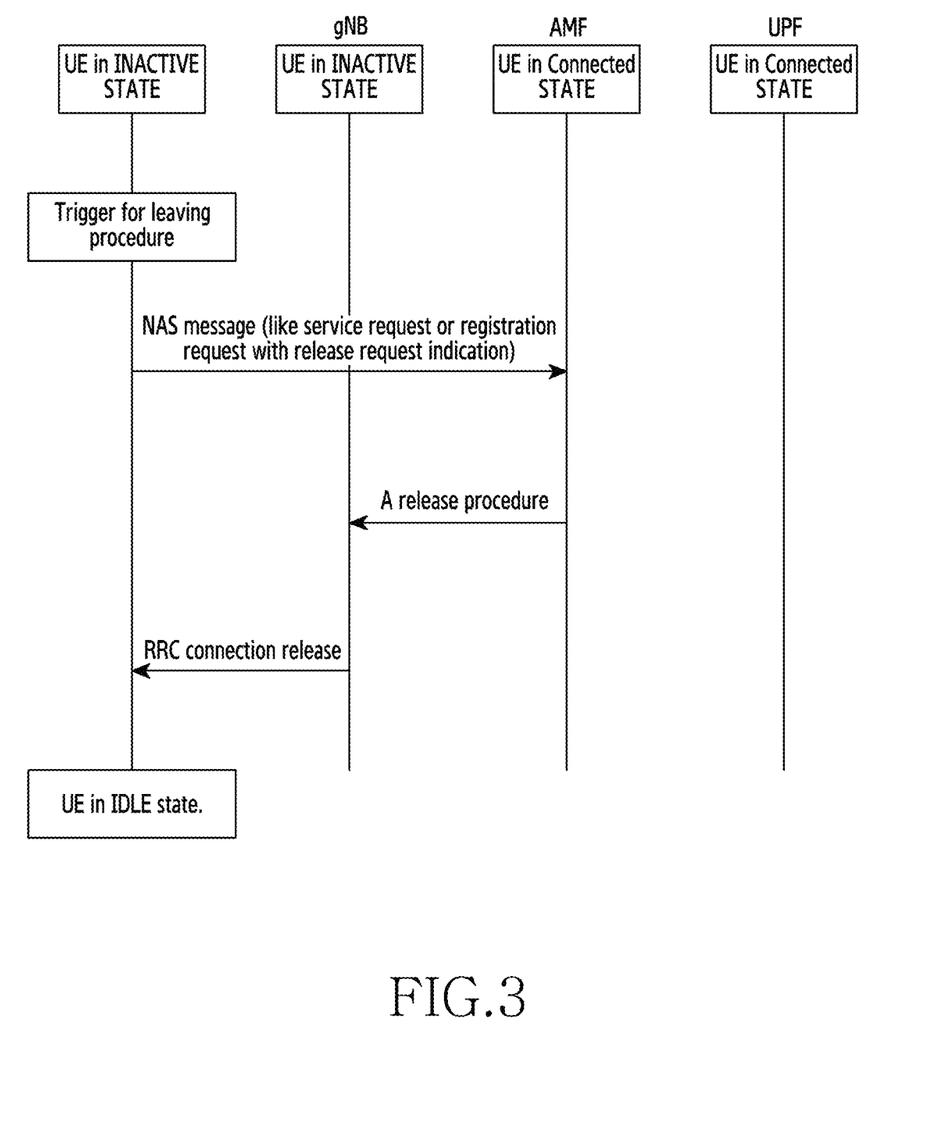
FIG. 3 illustrates a flow diagram depicting another example of the leaving procedure according to embodiments of the present disclosure.
Figure 4:
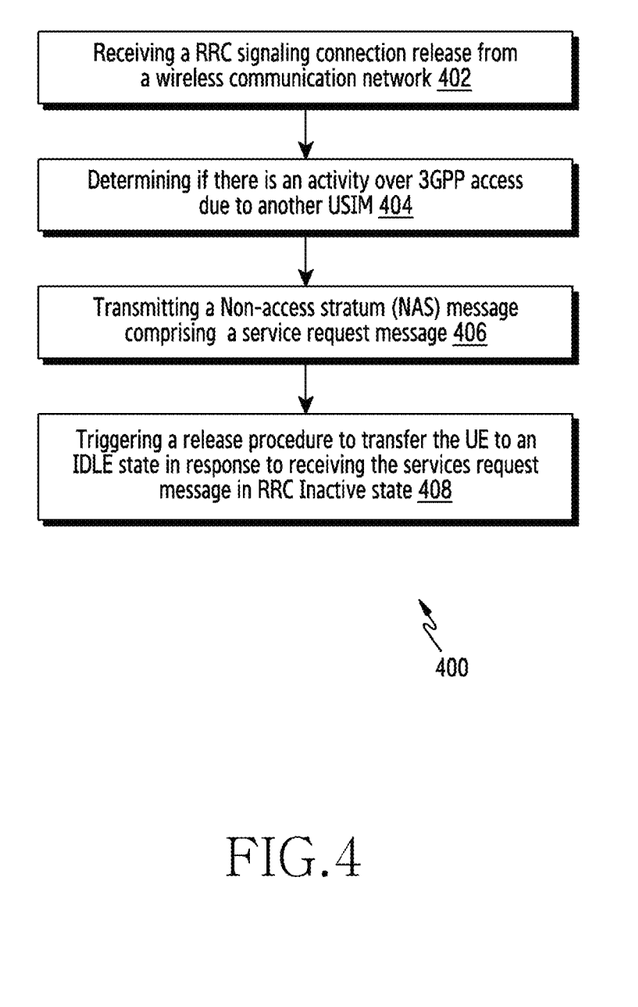
FIG. 4 illustrates a method of UE operation from a radio resource control (RRC) inactive state to an IDLE state according to embodiments of the present disclosure.

The embodiments herein achieve methods and systems of triggers of the leaving procedure in wireless communication networks. Referring now to the drawings, and more particularly to FIGS. 2-4, where similar reference characters denote corresponding features consistently throughout the figures, there are shown at least one embodiment Embodiments herein refer to a multi-USIM UE, which is a UE with multiple USIMs, capable of maintaining a separate registration state with a public land mobile network (PLMN) for each USIM at least over 3GPP access.

FIG. 2 illustrates hardware components of a UE 200, according to embodiments as disclosed herein. The UE 200 includes a memory 230, a communicator 220, at least one processor 240, and a controller 210 connected with the memory 130 and the at least one processor 140 is configured to receive an RRC signaling connection release from a wireless communication network, wherein the RRC signaling connection release indicates that the UE moves to RRC inactive state. The UE 200 is in a MUSIM mode. The controller 210 is further configured to determine if there is an activity over 3GPP access due to another USIM. The controller 210 is further configured to transmit a NAS message comprising a service request message. The service request message comprises a release request indication in response to determining that the UE 200 is in the RRC INACTIVE state, and the activity over a 3GPP access due to another USIM. The controller 210 is further configured to trigger using a wireless communication network, a release procedure to transfer the UE 200 to an IDLE state in response to receiving the services request message in RRC Inactive state. In some embodiments, the release request indicates that the UE 200 does not accept paging or requests the network to return to the IDLE state after sending the release request indication.

FIG. 3 illustrates a flow diagram depicting the leaving procedure. Whenever, the UE 200 is entering a situation where the UE is aware that the UE may not be able to respond to the RAN paging in RRC INACTIVE state, as discussed for the example scenarios in the problem statement, another e.g., is if UE_1 of MUSIM UE is in the INACTIVE state the UE_2 is about to start the voice call UE_1 radio may stop listening to any paging from UE_1, in all such example cases, the UE triggers the connection release procedure(also called as leaving procedure) so that UE can be moved to IDLE state; i.e., the UE 200 is allowed to trigger leaving procedure from INACTIVE state.

In an embodiment herein, on a reception of RAN level paging, the UE triggers the connection release procedure (also called as leaving procedure).

In an embodiment herein, when the NAS layer is informed that the UE is transitioned from an RRC inactive state to 5GMM-Connected state, the UE triggers the connection release procedure (also called as leaving procedure).

When the UE in 5GMM-CONNECTED mode with an RRC inactive indication receives a fallback indication from lower layers, and the UE has no pending NAS procedure and no pending uplink user data for PDU session(s) with user-plane resources already established, the UE may enter 5GMM-IDLE mode (optionally) and initiate the leaving procedure, if the UE wants to remain in IDLE state or RRC Inactive state.

When the UE in 5GMM-CONNECTED mode with an RRC inactive indication receives a fallback indication from lower layers, and the UE has no pending NAS procedure and no pending uplink user data for PDU session(s) with user-plane resources already established, the UE may enter 5GMM-IDLE mode and may not initiate any NAS procedure, if the UE wants to remain in IDLE state or RRC Inactive state. When the UE wants to receive service on this network, the UE can initiate the NAS procedure; for e.g., by initiating the registration procedure for mobility and periodic registration update used for mobility (i.e., the 5GS registration type IE set to "mobility registration updating" in the REGISTRATION REQUEST message) for N1 NAS signalling connection recovery, as specified in 3GPP standard specification 24.501.

In an embodiment herein, as part of the leaving procedure also called as connection release procedure, the UE sends the NAS message for example service request message (with leaving indication or release request indication or release indication) or registration request message (with leaving indication or release request indication or release Indication) to indicate to the network that the UE wants to leave the current network and wants to be released to IDLE state. The AMF on reception of this NAS message may trigger AN release procedure and move the UE to CM-IDLE state.

In an embodiment herein, if the RAN level paging fails that in response to RAN paging, if the UE does not send a response RRC message, the gNB may release the N2 and N3 connection (also called as tunnels or interfaces). The UE is moved to the IDLE state from the network perspective.

In an embodiment herein, if an RAN level paging fails that in response to RAN paging, if the UE does not send a response RRC message, the gNB may release the N2 and N3 connection. The UE is moved to the IDLE state from the network perspective only if the gNB is aware that the UE is MUSIM UE and supports one or more of the MUSIM features (such as, but not limited to, connection release, paging indication for voice service, reject paging request, paging restriction, and so on).

In an embodiment herein, if RAN node receives the busy indication or paging reject indication in response to RAN paging, the gNB may release the N2 and N3 connection. The UE is moved to the IDLE state from the network perspective by executing an RRC connection release procedure.

Embodiments herein have been described using a NAS message as an example of a service request message (with release request indication flag or release indication flag), but it may be obvious to a person of ordinary skill in that the embodiments disclosed herein may be applicable to scenarios, where the UE has initiated service request message without release request flag.

Embodiments herein have been described using a NAS message as an example of a service request message, but it may be obvious to a person of ordinary skill in that the embodiments disclosed herein may be applicable to other UE initiated NAS procedures too unless explicitly mentioned for any particular NAS message name.

Embodiments herein have been from the perspective of 5GS, but it may be obvious to a person of ordinary skill in that the embodiments disclosed herein may be applicable to scenarios, where the equally applicable for evolved packet system (EPS) case core network node is MME instead of AMF.

Embodiments disclosed herein are equally applicable to both the 5GS and 4GS, wherein the respective RAN nodes to be used is eNB for EPS/4GS NG-eNB/gNB for NR/5GS.

The embodiments disclosed herein can be implemented through at least one software program running on at least one hardware device and performing network management functions to control the elements. The elements can be at least one of a hardware device or a combination of hardware device and software module.

FIG. 4 illustrates a method 400 to move the UE from a radio resource control (RRC) inactive state to an IDLE state according to various embodiments of the present disclosure. At step 402, the method 400 includes receiving, by the UE 200, a RRC signaling connection release from a wireless communication network. The RRC signaling connection release indicates that the UE 200 moves to RRC Inactive state. The UE 200 is in a MUSIM) mode. At step 404, the method 400 includes determining, by the UE 200, if there is an activity over 3GPP access due to another USIM. At step 406, the method 400 includes transmitting, by the UE 200, a NAS message including a service request message. The service request message comprises a release request indication in response to determining that the UE 200 is in the RRC INACTIVE state, and the activity over a 3GPP access due to another USIM. At step 408, the method 400 includes triggering, by the wireless communication network, a release procedure to transfer the UE to an IDLE state in response to receiving the services request message in RRC Inactive state.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE), the method comprising:
identifying that the UE is in a $5^{th}$ generation mobility management (5GMM)-CONNECTED mode;
identifying an activity on a first universal subscriber identity module (USIM) in a $3^{rd}$ generation partnership project (3GPP) access; and
performing a service request procedure for requesting a release of a connection between the UE and an access and mobility management function (AMF) entity in the 3GPP access for a second USIM,
wherein the UE supports a multi-USIM (MUSIM).

2. The method of claim 1, further comprising:
transmitting a service request message including a release request indication.

3. The method of claim 2, further comprising:
determining that the UE rejects a radio access network (RAN) paging, and
wherein the service request message including the release request indication is transmitted as a response to the determining that the UE rejects the RAN paging.

4. The method of claim 2, wherein the service request message is transmitted to the AMF entity via a non-access stratum (NAS) message.

5. The method of claim 2, wherein an access network (AN) release is triggered based on the service request message.

6. A user equipment (UE), comprising:
a transceiver; and
a controller coupled to the transceiver, and configured to:
identifying that the UE is in a $5^{th}$ generation mobility management (5GMM)-CONNECTED mode,
identify an activity on a first universal subscriber identity module (USIM) in a $3^{rd}$ generation partnership project (3GPP) access, and
perform a service request procedure for requesting a release of a connection between the UE and an access and mobility management function (AMF) entity in the 3GPP access for a second USIM,
wherein the UE supports a multi-USIM (MUSIM).

7. The UE of claim 6, wherein the controller is further configured to;
transmit a service request message including a release request indication.

8. The UE of claim 7, wherein the controller is further configured to:
determine that the UE rejects a radio access network (RAN) paging, and
wherein the service request message including a release request indication is transmitted as a response to the determination that the UE rejects the RAN paging.

9. The UE of claim 7, wherein the service request message is transmitted to the AMF entity via a non-access stratum (NAS) message.

10. The UE of claim 7, wherein an access network (AN) release is triggered based on the service request message.

11. A method performed by an access and mobility management function (AMF) entity, the method comprising:
receiving, from a user equipment (UE) supporting a multi-universal subscriber identity module (MUSIM), a service request message for performing a service request procedure,
wherein the service request message includes a release request indication for requesting a release of a connection between the UE and the AMF entity in a $3^{rd}$ generation partnership project (3GPP) access for a second USIM, based on an activity on a first USIM in the 3GPP access, and
wherein the UE is in a $5^{th}$ generation mobility management (5GMM)-CONNECTED mode.

12. The method of claim 11, wherein the service request message including the release request indication is received as a response to determining that the UE rejects a radio access network (RAN) paging.

13. The method of claim 11, wherein the service request message is received from the UE via a non-access stratum (NAS) message.

14. The method of claim 11, the method further comprising:
   triggering an access network (AN) release based on the service request message.

15. An access and mobility management function (AMF) entity, the AMF entity comprising:
   a transceiver; and
   a controller coupled to the transceiver, and configured to:
      receive, from a user equipment (UE) supporting a multi-universal subscriber identity module (MUSIM), a service request message for performing a service request procedure,
   wherein the service request message includes a release request indication for requesting a release of a connection between the UE and the AMF entity in a $3^{rd}$ generation partnership project (3GPP) access for a second USIM, based on an activity on a first USIM in the 3GPP access, and
   wherein the UE is in a $5^{th}$ generation mobility management (5GMM)-CONNECTED mode.

16. The AMF entity of claim 15, wherein the service request message including the release request indication is received as a response to determining that the UE rejects a radio access network (RAN) paging.

17. The AMF entity of claim 15, wherein the service request message is received from the UE via a non-access stratum (NAS) message.

18. The AMF entity of claim 15, the controller is further configured to:
   trigger an access network (AN) release based on the service request message.

* * * * *